United States Patent
Leonard

(10) Patent No.: US 8,424,019 B1
(45) Date of Patent: Apr. 16, 2013

(54) MANAGING CHANNEL INSTANCES IN A MESSAGING-MIDDLEWARE ENVIRONMENT

(75) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 541 days.

(21) Appl. No.: 12/708,652

(22) Filed: Feb. 19, 2010

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/314

(58) Field of Classification Search ............ 719/314
See application file for complete search history.

(56) References Cited

U.S. PATENT DOCUMENTS

| | | | | |
|---|---|---|---|---|
| 2007/0294708 | A1* | 12/2007 | Kline | 719/320 |
| 2008/0301709 | A1* | 12/2008 | Ban | 719/314 |
| 2010/0162265 | A1* | 6/2010 | Heddes | 719/314 |

OTHER PUBLICATIONS

IBM, WebSphere MQ—Intercommunicaiton Version 6.0, 2005, IBM, pp. 1-573.*
Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).
Ben Mann, Worldwide Product Manager, Providing a backbone for connectivity with SOA Messaging, IBM WebSphere.software, Service oriented architecture solutions, White paper, Updated: Jun. 2009, 32 pages, ibm.com/webspheremq, Copyright IBM Corporation 2009, Produced in the United States of America 03-07.

* cited by examiner

*Primary Examiner* — Diem Cao

(57) ABSTRACT

A method, system, and medium are provided for terminating individual instances of a channel, without terminating all instances of the channel. Embodiments of the invention may be practiced in a messaging-middleware environment. The channels are used to communicate messages between components associated with the messaging-middleware application. For example, the channels may communicate messages between a client application and a queue manager. Embodiments of the present invention may present a user interface that displays individual channel instances and provides a mechanism for the user to select channel instances for termination.

14 Claims, 7 Drawing Sheets

| | 520 | 522 | 524 | 526 | 528 | 530 | 532 | 534 |
|---|---|---|---|---|---|---|---|---|
| * | CHANNEL NAME ▲ | STATUS | CONNECTION NAME | LAST MSG DATE | LAST MSG TIME | MSGS. | PID | TID |
| | XAP.CLIENT | RUNNING | 99.232.91.117 | 2009-10-28 | 14.08.22 | 10 | 12445 | 18 |
| | XAP.CLIENT | RUNNING | 99.232.91.117 | 2009-10-28 | 14.08.22 | 10 | 6094 | 409 |
| | XAP.CLIENT | RUNNING | 99.232.91.117 | 2009-10-28 | 13.05.41 | 6 | 12445 | 13 |
| | XAP.CLIENT | RUNNING | 99.232.91.117 | 2009-10-28 | 13.05.41 | 6 | 6094 | 404 |
| | XAP.CLIENT | RUNNING | 99.232.91.117 | 2009-10-28 | 12.31.57 | 9 | 12445 | 12 |
| | XAP.CLIENT | RUNNING | 99.232.91.117 | 2009-10-28 | 12.31.47 | 18 | 6094 | 403 |
| | XAP.CLIENT | RUNNING | 99.232.91.117 | 2009-10-28 | 12.31.47 | 19 | 12445 | 4 |
| | XAP.CLIENT | RUNNING | 99.232.91.117 | 2009-10-28 | 12.27.11 | 6 | 12445 | 3 |
| | XAP.CLIENT | RUNNING | 99.232.91.117 | 2009-10-28 | 12.27.11 | 9 | 6094 | 373 |
| | XAP.CLIENT | RUNNING | 99.232.91.117 | 2009-10-28 | 12.27.01 | 6 | 6094 | 372 |

CHANNEL STATUS LIST
CHANNEL NAME |XAP*
INSTANCE TYPE CURRENT

18 / 18

REFRESH — 540
START — 542
START/STOP... — 544
DEFINITION... — 546
END — 548
500
510

FIG. 5.

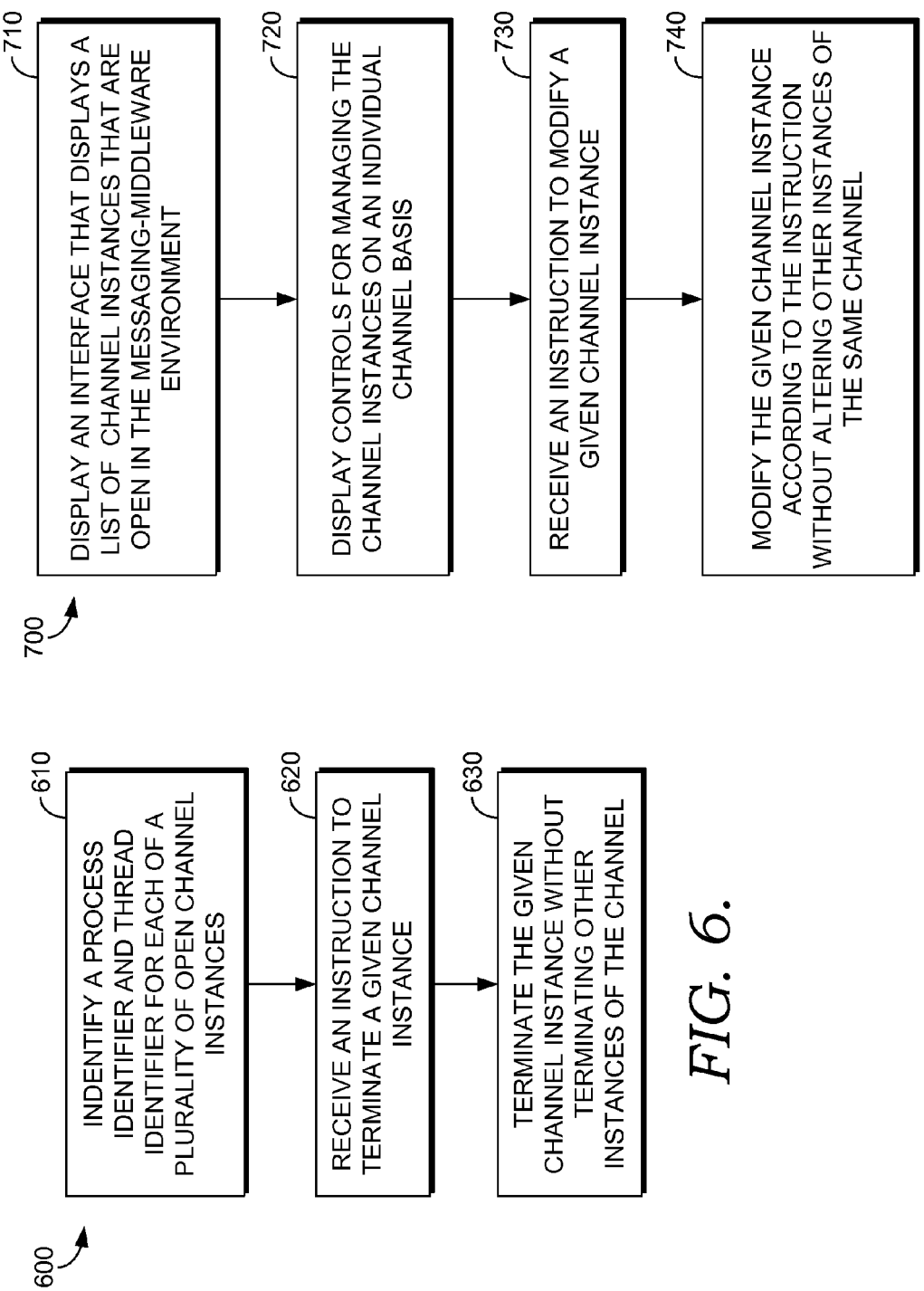

MANAGING CHANNEL INSTANCES IN A MESSAGING-MIDDLEWARE ENVIRONMENT

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative aspect, ways of managing channel instances running in a messaging-middleware environment. One method includes identifying a process identifier and a thread identifier for each of a plurality of open channel instances. A channel instance communicates messages between objects within a messaging-middleware environment. The method also includes receiving an instruction to terminate a given instance of a channel. The instruction identifies the given instance by the given instance's thread identifier and process identifier. The method also includes terminating the given instance without terminating other instances of the channel.

In another aspect, ways of automatically managing channel instances running in a messaging-middleware environment are disclosed. One method includes displaying an interface that presents a list of channel instances that are open in the messaging-middleware environment. The method also includes displaying controls for managing the channel instances on an individual channel basis. The method further includes receiving an instruction to modify a given channel instance. The method also includes modifying the given channel instance according to the instruction without altering other instances of the same channel.

In a third aspect, a way of managing channel instances running in a messaging-middleware environment. One method includes displaying a list of open channel instances that are communicating messages to a queue manager and receiving an instruction to terminate a given instance of a channel within the list. Multiple instances of the channel are open at a time when the instruction is received. The method also includes terminating the given instance without terminating any other instances of the multiple instances of the channel.

BRIEF DESCRIPTION OF THE SEVERAL VIEWS OF THE DRAWINGS

Illustrative embodiments of the present invention are described in detail below with reference to the included drawing figures, wherein:

FIG. 5 is a diagram showing a user interface used to manage channel instances according to an embodiment of the present invention;

FIG. 6 is a flow diagram of a method of terminating an individual channel instance according to an embodiment of the present invention;

FIG. 7 is a flow diagram of a method of automatically managing channel instances running in a messaging-middleware environment according to an embodiment of the present invention.

DETAILED DESCRIPTION

Embodiments of the present invention will be better understood from the detailed description provided below and from the accompanying drawings of various embodiments of the invention. Embodiments of the present invention allow individual instances of a channel to be terminated, without terminating all instances of the channel. Embodiments of the invention are practiced in a messaging-middleware environment. Channels are used to communicate messages between components associated with the messaging-middleware application. For example, the channels is used to communicate messages between a client application and a queue manager. An embodiment of the present invention presents a user interface that displays one or more channel instances and provides a mechanism for the user to a select a single channel instance for termination.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
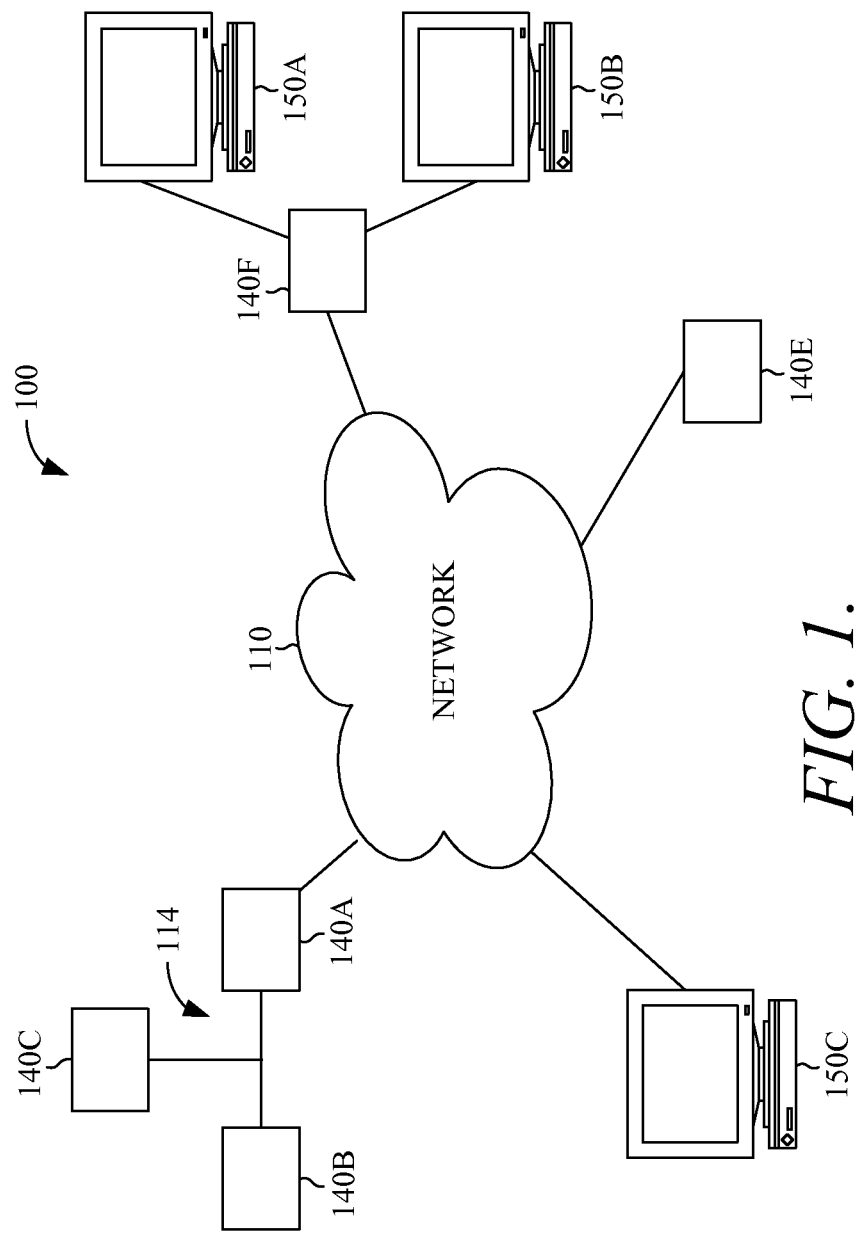
FIG. 1 is a drawing of an illustrative environment in which an embodiment of the present invention operates.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C, which communicate with each other via LAN 114, servers 140E and 140F, all of which communicate with each other via network 110. Operating environment 100 is merely an example of one suitable networking environment.

The client computing devices 150A, 150B, and 150C are configured for storing and/or processing computer-executable instructions and computer-readable data. The client computing devices 150A, 150B, and 150C can be a personal computer, desktop computer, laptop computer, handheld device, cellular phone, consumer electronic, digital phone, smartphone, PDA, or the like.

Network 110 might include a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 can comprise subsystems that transfer data between servers or computing devices. For example, network 110 may also include a point-to-point connection, the Internet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

Operating environment 100 is merely exemplary. While the servers 140A-F are illustrated as single severs, they may be scalable. For example, the server 140C may, in actuality, include multiple servers in communication. The single server depictions are meant for clarity.

Figure 2:
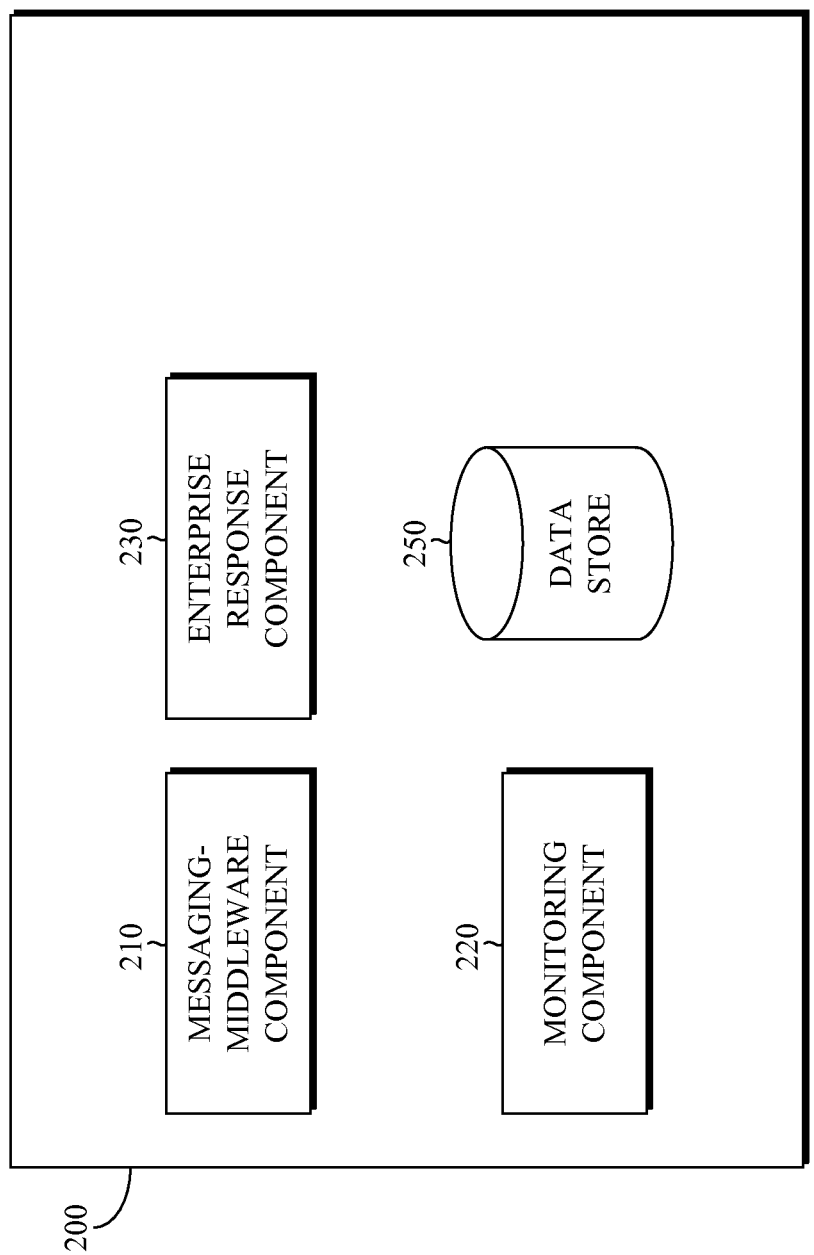
FIG. 2 is a drawing of an operating environment in which an embodiment of the present invention is practiced.

Turning now to FIG. 2, a block diagram depicts an exemplary computing-system architecture 200 suitable for managing channel instances in a queue manager. The exemplary computing-system architecture 200 should not be interpreted as having any dependency or requirement related to any single component or combination of components illustrated therein.

Exemplary computing-system architecture 200 includes a messaging-middleware component 210, a monitoring component 220, an enterprise response component 230, and data store 250. Exemplary computing-system architecture 200 can reside in a single computing device. In the alternative, exemplary computing-system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a. message-oriented middleware) include IBM's WebSphere® MQ (formerly MQ Series®), Fiorano's MQ, Oracle Advanced Queuing (AQ), and Microsoft's MSMQ. For example, information from a front-end application is formed into one or more messages. These messages from the front-end application are placed in a sending queue within the messaging-middleware component 210 and transferred into a receiving queue within the messaging-middleware component 210. A back-end program retrieves the message from the receiving queue. The message is transmitted through channels associated with the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the channel name attribute is preset, but the number of channels open on a queue manager changes based on the number of channels currently open.

Monitoring component 220 is configured to monitor messaging-middleware objects (e.g., channels and queues) for upset conditions that could require corrective actions. Examples of commercially available monitoring components include HP Openview®, Q Pasa!® by MQSoftware, Candle's PathWAI, and BMC Patrol. In one embodiment, the monitoring component 220 is able to retrieve, store, and evaluate channel information periodically to ascertain whether an upset condition is present. For example, the number of channels running on a queue manager could be retrieved. Having retrieved one or more attribute values, the monitoring component 220 evaluates one or more attribute values against threshold values within the monitoring component 220. The monitoring component 220 generates an alarm or incident message if attribute values are outside of normal operating conditions. The monitoring component 220 is able to perform one or more calculations with the one or more attribute values to arrive at a threshold.

The monitoring component 220 is also configured to generate and transmit notifications describing potential problems within a channel. A problem may be present when one or more attribute values or calculated values fall outside of a normal operating range. In one embodiment, the information about the potential problem is transmitted to enterprise response component 230. In another embodiment, the monitoring component 220 directly notifies a designated responder about the potential problem.

Enterprise response component 230 is configured to coordinate a response to a problem detected in a channel. The enterprise response component 230 receives information regarding a malfunction from a monitoring component 220 or another source. Upon receiving notification of a malfunction, the enterprise response component 230 may page a designated responder to investigate the upset condition. A designated responder can be an individual person or group of people given responsibility to fix upset conditions within certain channels. In another embodiment, the designated responder is a computer application that takes corrective actions. The enterprise response component 230 may help a designated responder trouble shoot by presenting one or more interfaces describing the problem. The interface may also provide tools that help the designated responder correct the problem. In one embodiment, the enterprise response component 230 provides an interface that allows the user to terminate individual instances of a channel. An example of such an interface is provided with reference to FIG. 5.

Figure 3:
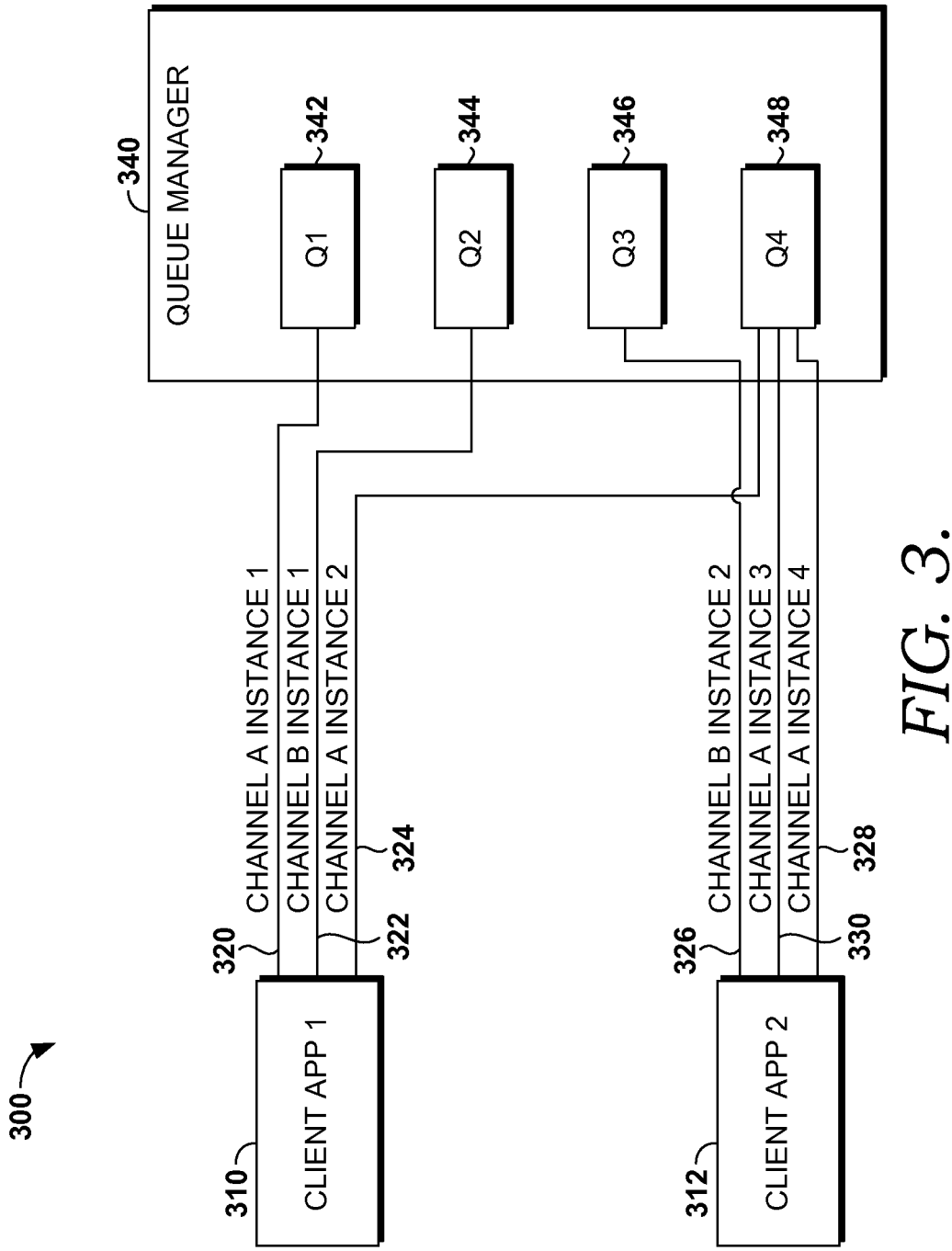
FIG. 3 is a diagram illustrating channel instances that are managed according to an embodiment of the present invention.

Turning now to FIG. 3, a diagram illustrating exemplary channel instances in a messaging-middleware environment 300 is shown, in accordance with an embodiment of the present invention. As mentioned previously, embodiments of the present invention allow a user to manage individual instances of channels. The channels are logical channels. They are used by queue managers and other entities within the messaging-middleware environment 300 to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. The channels may be set up automatically by a message channel agent or other component when a queue manager has one or more messages to transmit to a second queue manager. Once established, a channel may be active for a designated period of time before it is automatically deactivated.

Messaging-middleware environment 300 includes client application 1 310, client application 2 312, and queue manager 340. Messages are communicated between the client applications and the queue manager 340 through channel instances. The individual queue manager 340 includes queue 1 342, queue 2 344, queue 3 346, and queue 4 348. In an actual embodiment, an individual queue manager may manage hundreds or thousands of individual queues. Four queues are shown for the sake of simplicity.

Messaging-middleware environment 300 includes four instances of channel A. As described previously, each instance of channel A shares a common definition. The channel definition defines attributes of each channel instance that govern how messages are communicated in the channel. A developer or other person responsible for the messaging-middleware environment 300 may use a library of channel definitions. Different channel definitions are used to initiate channel instances suitable for communicating certain types of messages under certain conditions. While individual channel instances have many characteristics in common, each channel instance may be differentiated by its process ID and a thread ID.

Figure 4:
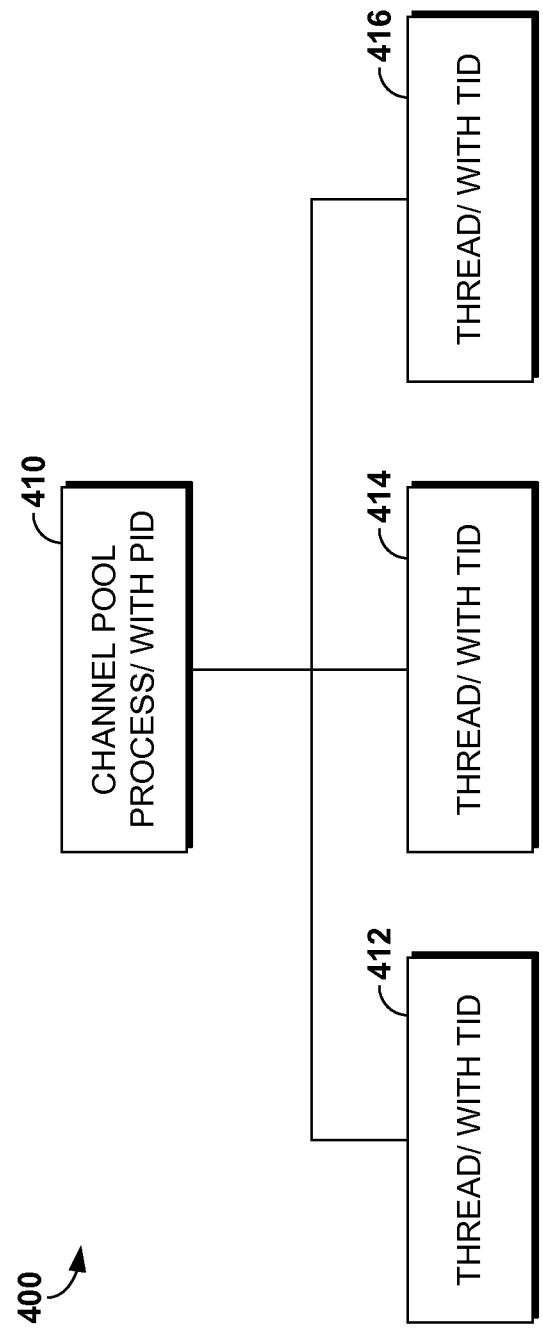
FIG. 4 is a diagram illustrating an organizational structure for naming channel instances in a messaging-middleware environment, in accordance with an embodiment of the present invention.

Turning briefly to FIG. 4, the relationship between a process ID and thread ID is shown. Initially, a group of channels may be pooled together by a queue manager and assigned the same process ID. A channel pool 410 may have several individual threads. The threads have a one-to-one relationship with channel instances. Each channel instance has its own thread. In FIG. 4, the channel pool 410 includes thread 412, thread 414, and thread 416. Each thread has its own thread ID. An individual channel instance can be uniquely identified by combining the channel process ID and the thread ID.

Returning now to FIG. 3, messaging-middleware 300 includes four instances of channel A and two instances of channel B. For the sake of illustration, all six channel instances shown may have the same process ID. Alternatively, each channel instance shown may have a different process ID depending on how the channel instances were pooled together. In one embodiment, channel instances are pooled sequentially in chronological order as they are initiated.

Channel A instance 1 320 is used to communicate messages between client app 1 310 and queue 1 342. Channel B instance 1 322 communicates messages between client app 1 310 and queue 2 344. Channel A instance 2 324 communicates messages between client app 1 310 and queue manager 4 348. This illustrates that instances of the same channel can communicate messages between different endpoints. For example, instance 320 and instance 324, both instances of channel A, communicate messages between different endpoints.

Channel B instance 2 326 communicates messages between client app 2 312 and queue 3 346. Channel A instance 3 330 communicates messages between client app 2 312 and queue 4 348. Channel A instance 4 328 communicates messages between client app 2 312 and queue 4 348. This illustrates that different instances of a channel can communicate between the same endpoints, as shown by instances 328 and 330. Though not shown, different channels can also communicate messages between the same two endpoints. Embodiments of the present invention are not limited by the example channel instances shown in FIG. 3.

Turning now to FIG. 5, a user interface 500 for managing individual channel instances is shown, in accordance with an embodiment of the present invention. Interface 500 includes a status list of open channel instances. The interface 500 allows a user to input a channel name, or a portion of a channel name, into a search box 510. The input is used to return a list of channel instances that have a name matching the input. Embodiments of the present invention are not limited by searching by a channel's name. Other channel attributes can be used to generate a list of channels that are responsive to the search criteria. In one embodiment, search box 510 includes a drop down box that allows a user to select active channel names.

The list of channel instances includes the name 520 of the channel instance. In this case, all channel instances shown have the same name because the list is populated based on a search for the channel name. The status of each channel instance is shown in column 522. In addition, the connection name 524 for each channel instance is shown. The last message shows the message time for the last message communicated through the channel instance. Column 530 shows the number of messages communicated through the channel instance.

Column 532 shows a process ID for the channel instances. Notice that some channel instances have the same process ID. For example, several have process ID "12445." Column 534 shows a thread ID for each channel instance. When combined with the process ID, the thread instance forms a unique identifier for the channel instance. Embodiments of the present invention are not limited to a list showing the attributes included on interface 500. These attributes are exemplary, and other attributes or fewer attributes may be shown on the status interface 500. In particular, the process ID and thread ID are not required to be displayed on the status list shown on interface 500. However, a command to terminate one of the channel instances should be addressable to the individual channel instance. In other words, a command issued from interface 500 needs to be able to find the individual channel instance according to its associated process ID and thread ID or other equivalent unique identifier. Including the process ID and thread ID in the same table is one way to facilitate addressing an individual channel instance. In another embodiment, a foreign key is inserted into a table describing the various channel instances and allows an individual channel instance to be addressable by a function attempting to manage the channel instance.

Channel status interface 500 includes a refresh button 540. Pushing the refresh button refreshes the information associated with the channels shown in the list along with the other data that changes over time. The start button 542 is used to start a new channel instance. The start/stop button 544 is used to pause or restart an individual channel instance. In one embodiment, a channel instance from the list is selected and the start/stop button 544 is pushed to pause that selected instance of the channel. Additional information about the channel instance, including the channel definition, may be displayed by selecting the definition button 546. An individual instance of a channel is terminated by selecting the end button 548. In one embodiment, a channel instance is selected from the list and then terminated when the cancel button is pushed. In one embodiment of the present invention, a subsequent interface (not shown) asking for confirmation is displayed before terminating the channel instance. In one embodiment, other instances of the same channel are not terminated when a single instance of the channel is terminated.

Turning now to FIG. 6, a method of terminating an individual channel instance is shown, in accordance with an embodiment of the present invention. At step 610, a process identifier and a thread identifier for each of a plurality of open channel instances is identified. A channel instance is a logical object used to communicate messages in a messaging-middleware environment. The plurality of open channel instances may include instances of one or more channels. As described previously, each channel is defined by attributes specified in its definition. For example, each channel may have a unique name. Each instance of that channel would then have the same name. Each instance of an individual channel would have the same characteristics defined by attributes in the channel's definition.

At step 620, an instruction to terminate an individual channel instance is received. The instruction identifies the individual channel instance by an individual thread identifier for the individual channel instance and an individual process identifier for the individual channel instance. In one embodiment, the instruction is generated by a user selecting the individual channel instance from a list and pushing a button indicating the user would like to terminate the individual channel instance. In one embodiment, a foreign key to a list of process IDs and thread IDs are used to link channel instances to the thread ID and process ID. A foreign key also allows the individual channel instance to be addressed by a function terminating the channel instance.

At step 630, the individual channel instance is terminated without terminating other instances of the channel. For example, if ten instances of channel A were open, an instruction to terminate one of the ten instances would not impact the other nine instances. The other nine instances would remain open and function as they were prior to terminating the individual channel instance.

Turning now to FIG. 7, a method of automatically managing channel instances running in a messaging-middleware environment is shown. At step 710, an interface displays a list of information describing a status of one or more channel instances that are open within a messaging-middleware environment. The information may include information similar to that shown with reference to FIG. 5. The status of a channel can be running, paused, terminated, or some other status. A channel that is open may run or be paused. A terminated or closed channel is no longer associated with a particular process ID or thread ID.

At step 720, one or more controls for managing the one or more channel instances on an individual channel basis are displayed. An individual channel instance is managed without altering other instances of the same channel. For example, an individual channel instance can be terminated or paused without terminating or pausing other instances of the same channel.

At step 730, an instruction to modify the individual channel instance is received. At step 740, the individual channel instance is modified according to the instruction. In one embodiment, an instruction to display certain channel instances conforming to a chosen criteria are received. For example, the instruction could be to display all channel instances associated with a particular queue or queue manager. In response, the display may show just channel instances that have the criteria.

Figure 8:
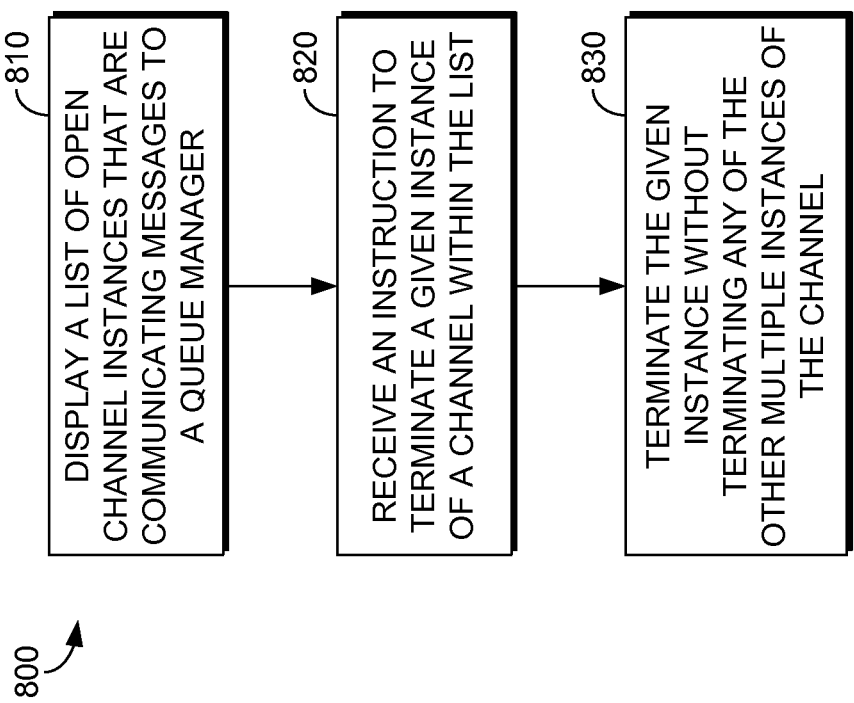
FIG. 8 is a flow diagram of a method of managing channel instances on a queue manager according to an embodiment of the present invention.

Turning now to FIG. 8, a method of managing channel instances on a queue manager is shown, in accordance with an embodiment of the present invention. At step 810, a list of open channel instances communicating messages to the queue manager is displayed. As described previously, the queue manager may be part of a messaging-middleware application. The channel instances are instances of a logical channel used to communicate messages to and from the queue manager.

At step 820, an instruction to terminate an individual instance of a channel within the list is received. Multiple instances of the channel are open at a time when the instruction is received. At step 830, the individual instance is terminated without terminating any other instances of the multiple instances of the channel. Thus, a single channel instance may be managed without impacting the status or operation of other instances of the same channel.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having computer-executable instructions embodied thereon for performing a method of managing channel instances running in a messaging-middleware environment, the method comprising:

indentifying a process identifier and a thread identifier for each of a plurality of open channel instances, wherein a channel instance communicates messages between objects within a messaging-middleware environment;

linking the process identifier and the thread identifier to the given instance in a table of open channel instances, wherein the linking is accomplished by inserting a foreign key with a link to the process identifier and the thread identifier into the table of open channel instances;

displaying an interface that presents a list of channel instances that are open in the messaging-middleware environment;

displaying controls for managing the channel instances on an individual channel basis;

receiving an instruction from a user to terminate a given instance of a channel through the interface, the instruction identifies the given instance by the given instance's thread identifier and process identifier; and terminating the given instance without terminating other instances of the channel.

2. The media of claim 1, wherein the interface displays a channel name and a channel status for each channel instance in the plurality of open channel instances.

3. The media of claim 2, wherein the interface displays a connection name for said each channel instance in the plurality of open channel instances.

4. The media of claim 1, wherein the method further includes receiving an instruction to display all channel instances associated with a single queue manager within the messaging-middleware environment, wherein the individual channel instance is associated with the single queue manager.

5. One or more non-transitory computer-readable media having computer-executable instructions embodied thereon for performing a method of managing channel instances running in a messaging-middleware environment, the method comprising:

displaying an interface that presents a list of channel instances that are open in the messaging-middleware environment;

displaying controls for managing the channel instances on an individual channel basis;

receiving an instruction from a user to modify a given channel instance by selecting a displayed control on the interface;

identifying a process identifier and a thread identifier that are associated with the given instance;

linking the process identifier and the thread identifier to the given instance in a table of open channel instances, wherein said linking is accomplished by inserting a foreign key with a link to the process identifier and the thread identifier into the table of open channel instances; and modifying the given channel instance according to the instruction without altering other instances of the same channel.

6. The media of claim 5, wherein the instruction is to terminate operation of the given channel instance, and wherein the given channel instance is terminated without terminating the other instances of the same channel.

7. The media of claim 5, wherein the instruction is to pause operation of the given channel instance, and wherein the given channel instance is paused without pausing the other instances of the same channel.

8. The media of claim 5, wherein the one or more channel instances each have the same channel definition.

9. The media of claim 5, wherein the one or more channel instances are each associated with a single process pool.

10. The media of claim 5, wherein the method further includes receiving an instruction to display all channel instances associated with a single queue within the messaging-middleware environment, wherein the one or more channel instances are each associated with the single queue.

11. The method of claim 5, wherein the method further includes receiving an instruction to display all channel instances associated with a single queue manager within the messaging-middleware environment, wherein the one or more channel instances are each associated with the single queue manager.

12. A method of managing channel instances running in a messaging-middleware environment, the method comprising:

displaying a list of open channel instances that are communicating messages to a queue manager on an interface;

receiving an instruction from a user to terminate a given instance of a channel within the list by selecting a control on the interface, wherein multiple instances of the channel are open at a time when the instruction is received;

identifying a process identifier and a thread identifier that are associated with the given instance;

linking the process identifier and the thread identifier to the given instance in a table of open channel instances, wherein said linking is accomplished by inserting a foreign key with a link to the process identifier and the thread identifier into the table of open channel instances; and terminating the given instance without terminating any other instances of the multiple instances of the channel.

13. The method of claim 12, wherein the method further comprises linking the process identifier and the thread identifier to the given instance in the table of open channel instances to make the given instance addressable for terminating the given individual instance.

14. The method of claim 12, wherein the method further includes receiving an instruction to display all channel instances associated with a single queue manager within the messaging-middleware environment, wherein each instance on the list of open channel instances is associated with the single queue manager.

* * * * *